United States Patent [19]

Anderson et al.

[11] 4,119,762

[45] Oct. 10, 1978

[54] COATING COMPOSITIONS COMPRISING ALKOXYMETHYLAMINOTRIAZINES AND POLYOLS

[75] Inventors: George J. Anderson, East Longmeadow; Timothy F. Desmond, Longmeadow; J. Owen Santer, East Longmeadow, all of Mass.

[73] Assignee: Monsanto Company, St. Louis, Mo.

[21] Appl. No.: 734,079

[22] Filed: Oct. 20, 1976

[51] Int. Cl.² .................. C08L 61/32; C08L 61/28
[52] U.S. Cl. ................... 428/524; 528/254; 260/849; 427/388 B; 428/460
[58] Field of Search ............ 260/67.6 R, 849; 427/388 B; 428/524

[56] References Cited

U.S. PATENT DOCUMENTS

| | | | |
|---|---|---|---|
| 3,449,467 | 6/1969 | Wynstra | 260/850 |
| 3,668,276 | 6/1972 | Riemhofer et al. | 260/850 |
| 3,852,375 | 12/1974 | Biethan et al. | 260/850 |
| 3,920,595 | 11/1975 | Anderson et al. | 260/22 |
| 3,959,201 | 5/1976 | Chang | 260/850 |
| 3,980,732 | 9/1976 | Isaksen et al. | 260/850 |
| 3,994,851 | 11/1976 | Chang | 260/850 |

*Primary Examiner*—John C. Bleutge
*Attorney, Agent, or Firm*—R. Bruce Blance; William J. Farrington; James C. Logomasini

[57] ABSTRACT

Coating compositions comprising alkoxymethylaminotriazines and polyols, which are useful for low temperature cure, are low in viscosity to allow ease of coating without the need for appreciable amounts of solvent thinners, and provide coatings free from the problems of crawling, cratering, pin-holing and "orange peel" formation. The alkoxymethylaminotriazines are preferably alkoxymethylmelamines. The polyols are polymethylol compounds containing an alicyclic or branched aliphatic structure. The compositions may be cured in the presence of acid catalysts in the temperature range of 70 to 105° C.

19 Claims, No Drawings

COATING COMPOSITIONS COMPRISING ALKOXYMETHYLAMINOTRIAZINES AND POLYOLS

1. Field of the Invention

This invention relates to coating compositions comprising a polyol and an aminoplast and in particular relates to coating compositions comprising a branched chain primary polyol and a substantially fully etherified substantially completely methylolated polyaminotriazine.

2. Description of the Prior Art

Coating compositions comprising hydroxy polyesters and similar hydroxy containing oligomers and polymers and aminoplast curing agents are well known in the prior art. Thus, U.S. Pat. Nos. 3,449,467 and 3,668,276 disclose orgainc solutions of hydroxy polyesters of moderately high molecular weight, containing aminoplasts and U.S. Pat. Nos. 3,852,375, 3,920,595 and 3,959,201 disclose high solids coating compositions comprising blends of hydroxy polyesters of moderately low molecular weight and aminoplast curing agents. However, in general these compositions are cured at temperatures well in excess of 100° C. and encompass enormously wide ranges of hydroxy polyester to aminoplast. Moreover, they are generally high in viscosity and therefore require some water or solvent to reduce the viscosity to a level adequate for coating applications. Coating compositions of suitable viscosity for coating applications may be prepared from monomeric polyols and aminoplasts. However, many such compositions, when they are applied to substrates, tend to crawl and form coatings of non-uniform thickness, and also tend to form craters and "orange peel" defects when they are cured.

A need therefore, exists for a high solids coating composition substantially free of solvent to provide high film build per application, to reduce volatile pollutants evolved during the baking cycle and to improve the economics of the coating process.

A need also exists for a high solids coating composition which can be cured at lower temperatures, for example, in the temperature range of 70° to 105° C., thus reducing the energy requirements for the curing process.

A need also exists for a high solids coating composition to provide smooth glossy films, which are free from the problems of crawling, cratering, pin hole formation and orange peel formation.

A need also exists for a high solids coating composition which can be formulated with hydroxy polyester oligomers and hydroxy acrylic oligomers to provide surface coating compositions which can be cured to provide coatings with good water, solvent and stain resistance.

SUMMARY OF THE INVENTION

These needs are met by a coating composition which is suitable for low temperature cure with an acid catalyst, comprising a polyol and a substantially completely methylolated polyaminotriazine substantially fully etherified with at least one $C_1$ to $C_4$ alcohol, wherein the polyol has a hydroxyl equivalent of less than about 150 and comprises at least one methylol compound containing at least two methylol groups separated by a divalent radical selected from the group consisting of branched aliphatic hydrocarbon radicals, alicyclic hydrocarbon radicals, branched aliphatic ether radicals, alicyclic ether radicals, branched aliphatic ester radicals and alicyclic ester radicals, wherein oxygen atoms in the molecule of the methylol compound are separated by at least three carbon atoms and wherein the ratio of hydroxyl groups of the polyol to alkoxymethyl groups of the polyaminotriazine is in the range of about 1:1 to about 1:2.

The term "polyol" is meant to include materials having two or more hydroxyl groups per molecule.

Other aspects of the invention are directed to articles of manufacture comprising substrates coated with a film of the above coating composition cured at a suitable temperature and to the process of coating substrates with a film of the above coating composition and curing the film at a temperature in the range of 60° to 175° C.

Some of the advantages of the disclosed compositions include low temperature curability in the temperature range of 70° to 105° C. especially in the presence of an acid catalyst of pKa less than 5, thus reducing the energy requirements for cure; low viscosity to allow ease of coating without the need for appreciable amounts of solvent thinners thus allowing high film build and reducing volatile pollutants; freedom of the films from crawling which causes non-uniform film thickness; and freedom of the films from cratering, pin-holing and orange peel formation which impair the protection afforded by the coating to the substrate and detract from the appearance of the film.

PREFERRED EMBODIMENTS

Polyols suitable for use in the present invention are methylol compounds containing at least two methylol groups per molecule separated by a divalent radical selected from the group consisting of alicyclic and branched aliphatic hydrocarbon radicals, alicyclic and branched aliphatic ether radicals and alicyclic and branched aliphatic ester radicals wherein oxygen atoms in the molecule of the methylol compound are separated by at least three carbon atoms. The polyols have a hydroxyl equivalent or weight per hydroxyl group of less than about 150. Suitable polyols can include one or more of the following methylol compounds: 2-methyl-1,3-propanediol, 2,2-dimethyl-1,3-propanediol, 2,2-diethyl-1,3-propanediol, 1,2-dimethylolcyclohexane, 1,3-dimethylolcyclohexane, 1,3-dimethylol-5-t-butylcyclohexane, 1,4-dimethylolcyclohexane, 1,2,3-trimethylolcyclohexane, 1,2,4-trimethylolcyclohexane, 1,3,5-trimethylolcyclohexane, 1,2,4,5-tetramethylolcyclohexane, 2-butyl-1,3-propanediol, trimethylolethane, trimethylolpropane, 2,2-dimethyl-3-hydroxypropyl 2,2-dimethyl-3-hydroxypropionate and the like. The polyol is preferably liquid at a temperature of 50° C. so that it can yield blends with the polyaminotriazine component which are liquid at room temperature and which are substantially free from the separation of a solid or semisolid phase. Methylol compounds which melt above 50° C. can be selected so that their blends are liquid at the desired temperature. The preferred methylol compounds include 2,2-dimetnyl-1,3-propanediol, 1,2-dimethylolcyclohexane, 1,3-dimethylolcyclohexane, 1,4-dimethylolcyclohexane, 1,3,5-trimethylolcyclohexane, 1,2,4-trimethylolcyclohexane, 2,2-dimethyl-3-hydroxypropyl 2,2-dimethyl-3-hydroxypropionate, trimethylolethane and trimethylolpropane. 1,4-Dimethylolcyclohexane is especially preferred since it yields blends with the polyaminotriazine component which cure to provide films of excellent gloss and hardness.

The polyaminotriazine component of the liquid composition is substantially completely methylolated and substantially fully etherified with at least one $C_1$ to $C_4$ alcohol. Suitable polyaminotriazine contain at least two amino groups per triazine ring and include formoguanamine, acetoguanamine, benzoguanamine, melamine and the like. They are reacted with formaldehyde to methylolate the amino groups and are then alkylated or etherified by reaction with the $C_1$ to $C_4$ alcohol or mixture of alcohols to provide unmixed or mixed ethers. These crosslinking agents can be prepared by the method set forth in U.S. Pat. No. 2,998,411. The etherified methylolated aminotriazines are liquid and are essentially monomeric or at most are oligomeric with an average degree of polymerization of no more than about 2, the aminotriazine rings being joined by methylene or methylene ether bridges formed by condensation of two methylol groups. Thus, the etherified aminotriazines within the scope of the invention possess a ratio of aminotriazine to combined formaldehyde in the range of about 1 : 2n − 0.5 to about 1 : 2n where n is the number of amino groups per triazine ring and possess a ratio of aminotriazine to alkyl ether groups in the range of about 1 : 2n − 1 to about 1 : 2n. The preferred aminotriazine is melamine since it has three amino groups per ring and is potentially hexafunctional. The preferred ethers are methyl ethers because they tend to be more reactive at low temperature and because they generate a relatively small amount of condensation volatiles during the crosslinking reaction with the polyol component of the liquid composition. Thus, the more preferred aminotriazine compounds are the methoxymethyl melamines in which the ratio of melamine to combined formaldehyde is in the range of 1 : 5.5 to 1 : 6 and the ratio of melamine to methoxy groups is in the range of 1 : 5 to 1 : 6. Among the more preferred aminotriazine compounds is monomeric hexamethoxymethyl melamine. A discussion of the concepts of methylolation and etherification is set forth in U.S. Pat. No. 3,471,388 which patent is incorporated herein by reference.

The liquid compositions of the present invention comprising the polyol and the aminotriazine components described hereinabove contain a ratio of polyol to aminotriazine compound such that the ratio of hydroxy groups in the polyol to alkoxymethyl groups in the aminotriazine compound is in the range of about 1:1 to about 1:2. Large excesses and deficiencies of aminotriazine component have been acceptable in the prior art solvent systems without detracting from film properties of the cured composition. However, when insufficient or excess aminotriazine component is used with the polyols of the present invention, the cured liquid composition is found to be undesirably soft and readily marred.

The liquid compositions of the present invention can be cured at temperatures in the range of 60° to 170° C. for a period of time in the range of several seconds to hours. Curing is readily effected in about 10 to 30 minutes at the lower end of the temperature range in the presence of an acid catalyst which is soluble in the liquid composition and has a pKa at 25° C. of less than 5. Among the acids which can be used are the mineral acids and sulfonic acids such as methanesulfonic acid, benzenesulfonic acid, and the toluenesulfonic acids. A preferred catalyst is p-toluenesulfonic acid since it is readily available, relatively non-volatile and easily dissolved in the liquid composition. Sufficient catalyst to provide the desired rate of cure at a selected temperature without causing excessively short pot-life is used. Generally from about 0.1 to about 10 percent is sufficient. For a satisfactory cure rate in the temperature range of 70° to 105° C., from about 0.2 to about 1 percent of catalyst provides undiluted liquid compositions with a pot-life or shelf-stability of seven (7) days or more at 25° C. Dilution with solvent can extend the storage stability almost indefinitely.

For improved flexibility of the cured composition, a polyoxypropylene triol of molecular weight in the range of 500 to 1000 can be used. The triols may be prepared by the base catalyzed addition of propylene oxide to triols such as trimethylolethane, trimethylolpropane, glycerol, 1,2,6-hexanetriol and the like. Surprisingly, it has been discovered that other polyether polyols such as polyether polyols of ethylene oxide, high molecular weight polyols of propylene oxide, and polyester polyols formed from caprolactone added to the liquid compositions of the present invention, cause crawling, cratering or crazing in cured films of the composition.

In addition to the components above, the compositions can contain other optional ingredients including various pigments, fillers, plasticizers, antioxidants, flow control agents, wetting agents and other agents of the type ordinarily used in surface coatings.

The compositions can be applied to paper, cloth, metal, wood, glass, and plastic substrates by any convenient method such as brushing, dipping, spray, roller coating, dip coating, etc. The ability to cure at low temperature is particularly advantageous with paper, cloth and wood substrates.

The invention will be further described and illustrated in the examples which follow. The examples are illustrative of the invention and should not be construed as limiting the scope to their details. All parts and percentages are by weight unless otherwise indicated.

EXAMPLE 1

18 Parts of 1,4-dimethylolcyclohexane is melted at 50° C. and is blended with 29 parts of a methoxymethylmelamine in which the melamine to combined formaldehyde ratio is 1:5.7, the melamine to methoxy ratio is 1:5.0 and the methoxy content is 14.3 meq. per gm. The blend is cooled to room temperature and 1.18 parts of a 20 weight percent solution of p-toluenesulfonic acid in isopropyl alcohol is added. The blend is applied to a bonderized No. 37 steel panel with a 75 micron coating blade to provide a dried film thickness of approximately 25 microns after it has been baked for 30 minutes at 93° C. The film shows slight crawl or retreat of the dried film from the edge of the initial wet film, has a hardness of 2H (ASTM D 3363-74), a forward impact of 35 cm-kg. (ASTM D 2794-69); solvent resistance of 200+ rubs and water spot resistance. The solvent resistance is determined by oscillating a Control-Flo Fountain Marking Pencil manufactured by Diagraph-Bradley Industries, Inc., containing a felt tip of approximately 1 cm diameter and filled with methyl ethyl ketone, on the coating surface using a uniform moderate pressure. The number of double strokes required to erode the film and cause break through to the metal is noted. The water spot test is carried out by adding a .05 ml drop of distilled water to the surface of the coating and covering the spot with a watch glass. After 4 hours at room temperature the spot is examined for blistering, swelling, or whitening. If these effects are absent the film is considered free of water damage.

EXAMPLES 2-5

Similar coatings are prepared from blends of the methoxymethylmelamine of Example 1 and a series of polyols. Curing is effected at 87° and 93° C. The compositions and coating data are presented in Table 1 together with the data for Example 1. Examples 1 and 2 are within the scope of the invention and show the superior resistance to crawl at the baking step and the superior film appearance compared with coatings of Examples 3-5 prepared with unbranched primary polyol (Example 3) and branched secondary polyols (Examples 4, 5).

EXAMPLES 6-10

A series of liquid composition blends is prepared with 1,4-dimethylolcyclohexane, the methoxymethylmelamine of Example 1 and a polyoxypropylene triol with a hydroxyl equivalent of 233. The weight ratio of 1,4-dimethylolcyclohexane to polyoxypropylene triol is 6:1. The various blends contain different ratios of hydroxyl groups of the diol and triol to methoxymethyl groups of the melamine compound. The data show that especially in the temperature range of 74°–105° C., the coatings prepared from the compositions are soft and easily marred when the ratio is appreciably outside the range of 1:1 to 1:2.

TABLE II

|  | Example 6 | Example 7 | Example 8 | Example 9 | Example 10 |
|---|---|---|---|---|---|
| Composition, pbw |  |  |  |  |  |
| Methoxymethylmelamine | 58 | 29 | 18 | 69 | 89 |
| 1,4-dimethylolcyclohexane | 36 | 36 | 36 | 36 | 36 |
| Polyoxypropylene triol | 6 | 6 | 6 | 6 | 6 |
| p-TSA | 1 | 0.7 | 0.6 | 1.1 | 1.2 |
| Ratio OH: methoxymethyl | 1:1.89 | 1:0.94 | 1:0.59 | 1:2.24 | 1:2.89 |
| Bake Cycle, 74° C. |  |  |  |  |  |
| Pencil Hardness | F-H | F-H | 4B | Tacky | HB |
| Forward Impact, cm-kg. | 69 | 25 | — | — | 116 |
| Sovent Resistance | exc. | exc. | poor | — | poor |
| Bake Cycle 82° C. |  |  |  |  |  |
| Pencil Hardness | 3H | H-2H (chipped) | B | HB | F |
| Forward Impact, cm-kg. | 30 | 23 | 58 | 23 | 35 |
| Solvent Resistance | exc. | exc. | exc. | exc. | exc. |
| Bake Cycle 105° C. |  |  |  |  |  |
| Pencil Hardness | 5H | 2H-3H (chipped) | HB | HB | F |
| Forward Impact, cm-kg. | 23 | 16 | 23 | 12 | 23 |
| Solvent Resistance | exc. | exc. | exc. | exc. | exc. |
| Bake Cycle 121° C. |  |  |  |  |  |
| Pencil Hardness | 4H | 4H (chipped) | F | F | F |
| Forward Impact, cm-kg. | 9.3 | 9-11 | 23 | 12 | 12 |
| Solvent REsistance | exc. | exc. | exc. | exc. | exc. | exc = excellent

TABLE I

COATINGS PREPARED FROM A SERIES OF POLYOLS

|  | Example 1 | | Example 2 | | Example 3 | | Example 4 | | Example 5 | |
|---|---|---|---|---|---|---|---|---|---|---|
|  | A | B | A | B | A | B | A | B | A | B |
| Composition, pbw |  |  |  |  |  |  |  |  |  |  |
| Methoxymethylmelamine | 29 | 29 | 29 | 29 | 29 | 29 | 29 | 29 | 29 | 29 |
| 1,4-dimethylolcyclohexane | 18 | 18 | — | — | — | — | — | — | — | — |
| DHP DHP | — | — | 25.5 | 25.5 | — | — | — | — | — | — |
| 1,5-pentanediol | — | — | — | — | 13 | 13 | — | — | — | — |
| 2-methyl-2,4-pentanediol | — | — | — | — | — | — | 14.8 | 14.8 | — | — |
| dipropylene glycol | — | — | — | — | — | — | — | — | 16.8 | 16.8 |
| p-TSA | 0.24 | 0.48 | 0.27 | 0.48 | 0.21 | 0.48 | 0.22 | 0.48 | 0.23 | 0.48 |
| Cure, 30 min. Temperature ° C. | 93 | 82 | 93 | 82 | 93 | 82 | 93 | 82 | 93 | 82 |
| Coating Appearance | 2 | 1 | 2 | 1 | 5 | 4 | 5 | 4 | 5 | 4 |
| Film Properties |  |  |  |  |  |  |  |  |  |  |
| Pencil Hardness | 2H | H | 2H | 2H | 2H | F | 2H | — | 2H | 2H |
| Forward Impact cm-kg. | 35 | 17 | 52 | 69 | 37 | — | 23 | — | 45 | — |
| Solvent Resistance (No. of rubs) | 200+ | 200+ | 200+ | 200+ | 200+ | — | 200+ | — | 200+ | — |
| Water Spot | 1 | 1 | 1 | 1 | 1 | — | 2 | — | 1 | 3 |

Legend (Table 1)
DHP DHP - 2,2-dimethyl-3-hydroxypropyl 2,2-dimethyl-3-hydroxypropionate
p-TSA - p-toluenesulfonic acid
Coating Appearance:
1 - no crawl, smooth, high gloss
2 - slight crawl, smooth, high gloss
3 - crawl, slight cratering
4 - crawl, cratering
5 - severe crawl, cratering
Water Spot:
1 - no damage
2 - slight damage
3 - damage

What is claimed is:

1. A liquid composition comprising 1,4-dimethylolcyclohexane and a substantially completely methylolated polyaminotriazine substantially fully etherified with at least one $C_1$ to $C_4$ alcohol, wherein the ratio of hydroxyl groups of the 1,4-dimethylolcyclohexane to alkoxymethyl groups of the polyaminotriazine is in the range of about 1:1 to about 1:2.

2. The composition of claim 1 wherein the polyaminotriazine is selected from the group consisting of benzoguanamine and melamine.

3. The composition of claim 1 wherein the polyaminotriazine is melamine and the alcohol is methyl alcohol.

4. A liquid composition comprising 1,4-dimethylolcyclohexane and a substantially completely methylolated melamine substantially fully etherified with methyl alcohol, wherein the ratio of hydroxyl groups of the 1,4-dimethylolcyclohexane to methoxymethyl groups of the melamine is in the range of about 1:1 to about 1:2.

5. A liquid composition comprising 1,4-dimethylolcyclohexane, a substantially completely methylolated polyaminotriazine substantially fully etherified with at least one $C_1$ to $C_4$ alcohol and from about 0.1 to about 10 weight percent of a soluble acid catalyst of pKa less than about 5, wherein the ratio of hydroxyl groups of the 1,4-dimethylolcyclohexane to alkoxymethyl groups of the polyaminotriazine is in the range of about 1:1 to about 1:2.

6. The composition of claim 5 wherein the polyaminotriazine is selected from the group consisting of benzoguanamine and melamine.

7. The composition of claim 5 wherein the polyaminotriazine is melamine and the alcohol is methyl alcohol.

8. The composition of claim 5 wherein the acid catalyst is a sulfonic acid.

9. A liquid composition comprising 1,4-dimethylolcyclohexane, a substantially completely methylolated melamine substantially fully etherified with methyl alcohol, and from about 0.2 to about 1 weight percent of p-toluenesulfonic acid, wherein the ratio of hydroxyl groups of the 1,4-dimethylolcyclohexane to methoxymethyl groups of the melamine is in the range of about 1:1 to about 1:2.

10. An article of manufacture comprising a substrate coated with the cured liquid composition of claim 1.

11. An article of manufacture comprising a substrate coated with the cured liquid composition of claim 2.

12. An article of manufacture comprising a substrate coated with the cured liquid composition of claim 5.

13. An article of manufacture comprising a substrate coated with the cured liquid composition of claim 6.

14. A process of coating a substrate which comprises applying a film of the liquid composition of claim 5 to the substrate and curing the film at a temperature in the range of about 60 to about 175° C.

15. The process of claim 14 wherein the temperature is in the range of about 70° to about 105° C.

16. A process of coating a substrate which comprises applying a film of the liquid composition of claim 1 to the substrate and curing the film at a temperature in the range of about 60° to about 175° C.

17. The process of claim 16 wherein the temperature is in the range of about 70° to about 105° C.

18. An article of manufacture comprising a substrate coated with the cured liquid composition of claim 4.

19. An article of manufacture comprising a substrate coated with the cured liquid composition of claim 9.

* * * * *